UNITED STATES PATENT OFFICE.

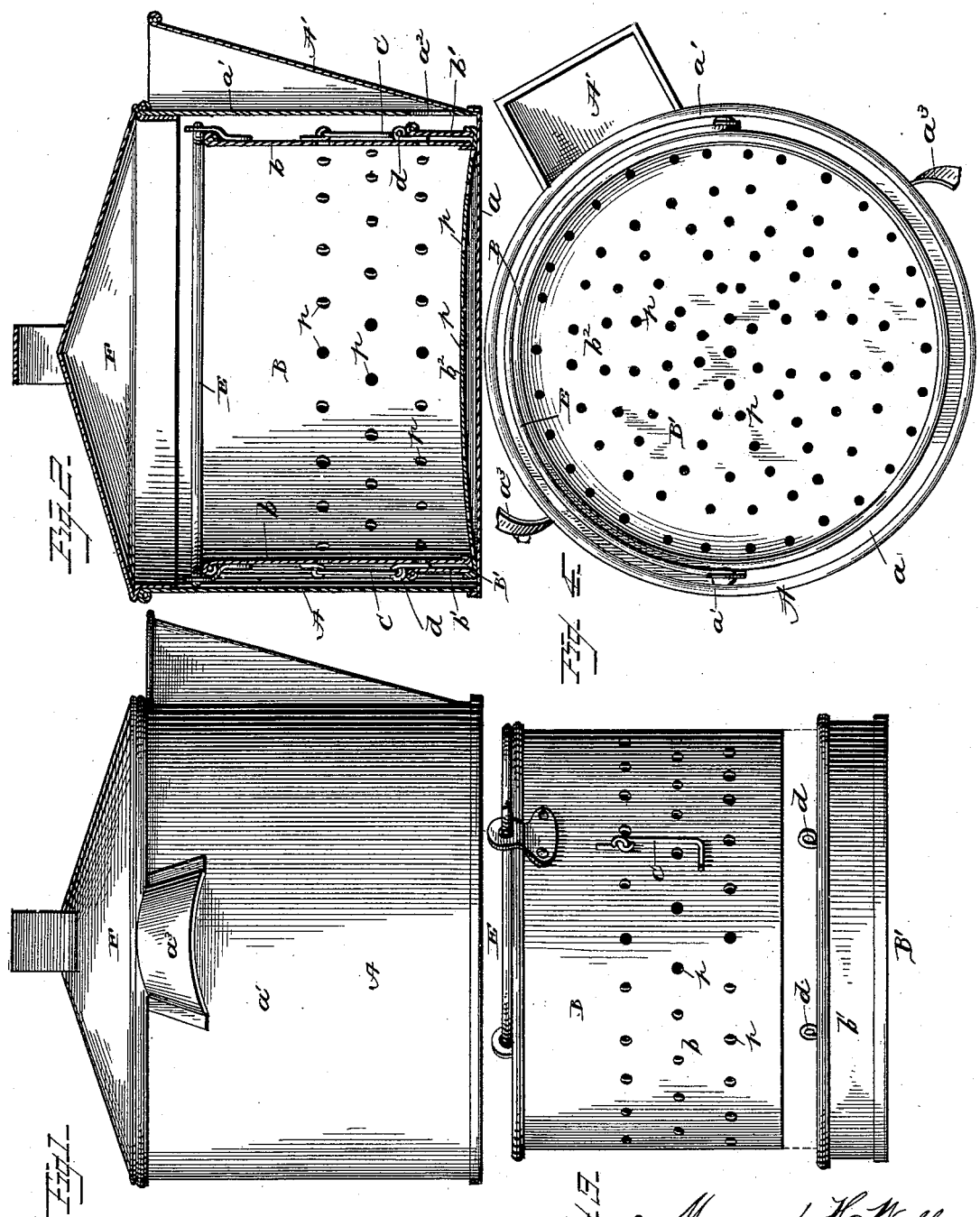

MARGARET H. WALLACE, OF SEDALIA, MISSOURI.

COOKING-VESSEL.

SPECIFICATION forming part of Letters Patent No. 307,885, dated November 11, 1884.

Application filed April 11, 1884. (No model.)

*To all whom it may concern:*

Be it known that I, MARGARET H. WALLACE, a citizen of the United States, residing at Sedalia, in the county of Pettis and State of Missouri, have invented certain new and useful Improvements in Cooking-Vessels; and I do hereby declare the following to be a full, clear, and exact description of the invention, such as will enable others skilled in the art to which it appertains to make and use the same.

This invention relates to that class of cooking-vessels which are designed to cook by boiling or steaming, and which comprise an outer vessel and a removable perforated inner vessel.

The object of my improvement is to provide a simple culinary utensil of this class which will possess advantages in point of durability, inexpensiveness, convenience, and general efficiency.

In the drawings, Figure 1 is a side elevation of the cooker. Fig. 2 is a cross-section taken vertically through the same. Fig. 3 is a side view of the interior vessel, showing its bottom detached. Fig. 4 is a plan or top view with the cover removed.

Corresponding parts in the figures are denoted by the same letters of reference.

Referring to the drawings, A designates the outer or main vessel, which is preferably of a cylindrical form, and comprises a horizontal bottom, $a$, from which extends vertical sides $a'$. The vessel A is provided with a perforation, $a^2$, near its bottom, from which extends a suitable spout, A', formed upon the surface of the vessel, and extending vertically to the top thereof. Handles $a^3 a^3$ are preferably provided upon the sides of the vessel A, by which the latter may be conveniently lifted and transported.

B designates the inner vessel, which corresponds in shape to the vessel A, and comprises a main portion having vertical sides $b$ and a removable bottom portion, B'. The vessel B is smaller than the vessel A in width and height, so that a suitable space will be left between the sides of the vessels when in position. The bottom portion, B', comprises sides $b'$ and a bottom, $b^2$, the latter being adapted to rest upon the bottom $a$, and preferably being of convexo-concave form, so that it will mainly project up from the same. The sides $b$ of the main portion B and the bottom $b'$ of the portion B' are provided with perforations $p$, so that the water within the vessel A can freely circulate in the inner vessel. Suitable hooks, G G, are arranged on diametrically-opposite sides of the main portion of the vessel B, and are adapted to engage eyes $d\ d$, projecting from the top edge of the side of the bottom portion. By means of these hooks the bottom portion of the inner vessel may be readily and conveniently detached or secured in position. The hooks preferably engage the eyes respectively from opposite sides, as shown in Fig. 2, to lessen the possibility of accidental detachment of the bottom portion. A bail, E, is provided upon the inner vessel, by which it may be readily lifted and transported, and a suitable cover, F, is provided for the main vessel.

The operation and advantages of my invention will be readily understood from the foregoing description and annexed drawings.

My improved cooker may be used with convenience and facility, and is simple and efficient. The articles to be cooked are placed in the inner vessel, and they may be thoroughly cooked by boiling without the disadvantage of breaking.

I claim as my invention—

1. As an improvement in cooking-vessels, the combination of a main or outer vessel and an inner vessel resting upon the bottom of the same and removable therefrom, the said inner vessel comprising a perforated main portion carrying the hooks and a detachable bottom portion consisting of the sides having the eyes or loops in the convexo-concave bottom, substantially as set forth.

2. The combination, in an improved cooking-vessel, with the main portion consisting of the perforated sides, and having depending hooks, of the bottom portion comprising the vertical sides having the eyes or loops, and the convexo-concave perforated bottom portion, substantially as set forth.

3. The herein-described cooking-vessel, comprising the outer or main vessel having the exterior or vertical spout, the inner vessel removably received by the outer vessel and adapted to rest upon the bottom of the same, the said inner vessel comprising a perforated main portion and a detachable bottom portion having sides receiving the main portion, and the cover for the main vessel, substantially as set forth.

In testimony whereof I affix my signature in presence of two witnesses.

MARGARET H. WALLACE.

Witnesses:
G. E. FEIST,
J. N. THEW.